US012684302B2

(12) United States Patent
Käsbach et al.

(10) Patent No.: US 12,684,302 B2
(45) Date of Patent: Jul. 14, 2026

(54) METHOD FOR PROVIDING A SELF-FITTING HEARING TEST

(71) Applicant: GN Hearing 2 A/S, Ballerup (DK)

(72) Inventors: Johannes Käsbach, Copenhagen S (DK); Lotte Hagen Hernvig, Copenhagen S (DK); David Landwehr, Hvidovre (DK)

(73) Assignee: GN Hearing 2 A/S, Ballerup (DK)

( * ) Notice: Subject to any disclaimer, the term of this patent is extended or adjusted under 35 U.S.C. 154(b) by 412 days.

(21) Appl. No.: 18/101,848

(22) Filed: Jan. 26, 2023

(65) Prior Publication Data

US 2024/0259740 A1 Aug. 1, 2024

(51) Int. Cl.
*H04R 25/00* (2006.01)

(52) U.S. Cl.
CPC ............. *H04R 25/70* (2013.01); *H04R 25/30* (2013.01); *H04R 25/55* (2013.01); *H04R 2225/67* (2013.01)

(58) Field of Classification Search
CPC ........ H04R 25/70; H04R 25/30; H04R 25/55; H04R 2225/67; H04R 25/405; H04R 25/554; A61B 5/123; A61B 5/128; A61B 5/121; A61B 5/12; A61B 5/125
USPC ........................................................ 381/312
See application file for complete search history.

(56) References Cited

U.S. PATENT DOCUMENTS 3,221,100 A * 11/1965 Towne ..................... A61B 5/12 73/585
4,060,701 A * 11/1977 Epley ..................... H04R 29/00 73/584
10,341,790 B2 * 7/2019 Shennib ............... H04R 25/554
10,455,337 B2 * 10/2019 Yoo ........................ A61B 5/123
11,852,901 B2 12/2023 Howell et al.
2005/0033193 A1 2/2005 Wasden et al.

(Continued)

FOREIGN PATENT DOCUMENTS

CN 106073797 A * 11/2016

OTHER PUBLICATIONS

Notice of Allowance for U.S. Appl. No. 18/102,542 dated Apr. 2, 2025.

(Continued)

*Primary Examiner* — Fan S Tsang
*Assistant Examiner* — Sean M Rinehart
(74) *Attorney, Agent, or Firm* — Vista IP Law Group, LLP

(57) ABSTRACT

A method for providing a self-fitting hearing test performed via a hearing device adapted to be worn at an ear of a user, the hearing device comprising an output transducer, a wireless communication interface, a processing unit, and a memory unit, the method comprising the steps of: performing a test-cycle comprising an emission timeslot, where a test sound is emitted by the hearing device, the test sound having a test volume and a test frequency, a response timeslot, where a user response indicating whether the user heard the test sound is detected, wherein the response timeslot comprises a grace period following the emission timeslot, and a test-cycle end step, where cycle data indicative of the test-cycle's test volume, test frequency, and user response is added to a test data set, calculating audiogram data indicative of the user's hearing ability based on the test data set, and outputting the audiogram data.

21 Claims, 6 Drawing Sheets

(56) References Cited

U.S. PATENT DOCUMENTS

| | | | | |
|---|---|---|---|---|
| 2007/0179398 | A1* | 8/2007 | Margolis | A61B 5/16 600/300 |
| 2009/0156959 | A1* | 6/2009 | Thornton | A61B 5/121 600/559 |
| 2010/0137739 | A1* | 6/2010 | Lee | A61B 5/121 600/559 |
| 2012/0029383 | A1* | 2/2012 | Henriksen | A61F 11/08 600/559 |
| 2012/0148054 | A1* | 6/2012 | Rank | H04R 25/552 381/23.1 |
| 2015/0358745 | A1* | 12/2015 | Rix | H04R 25/305 381/60 |
| 2021/0138333 | A1* | 5/2021 | Harrison | A63B 69/0028 |
| 2024/0259740 | A1 | 8/2024 | Käsbach et al. | |

OTHER PUBLICATIONS

Non-Final Office Action for U.S. Appl. No. 18/102,542 dated Nov. 20, 2024.

Non-Final Office Action for U.S. Appl. No. 18/102,614 dated Jul. 9, 2025.

Final Office Action for U.S. Appl. No. 18/102,614 dated Mar. 23, 2026.

* cited by examiner

Fig. 4
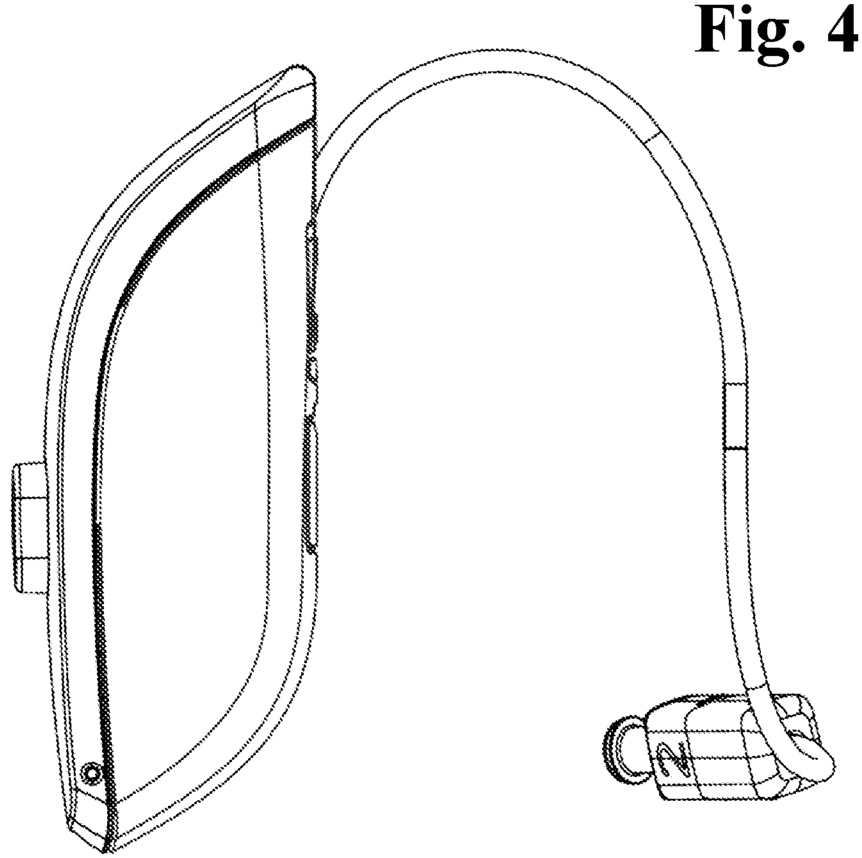
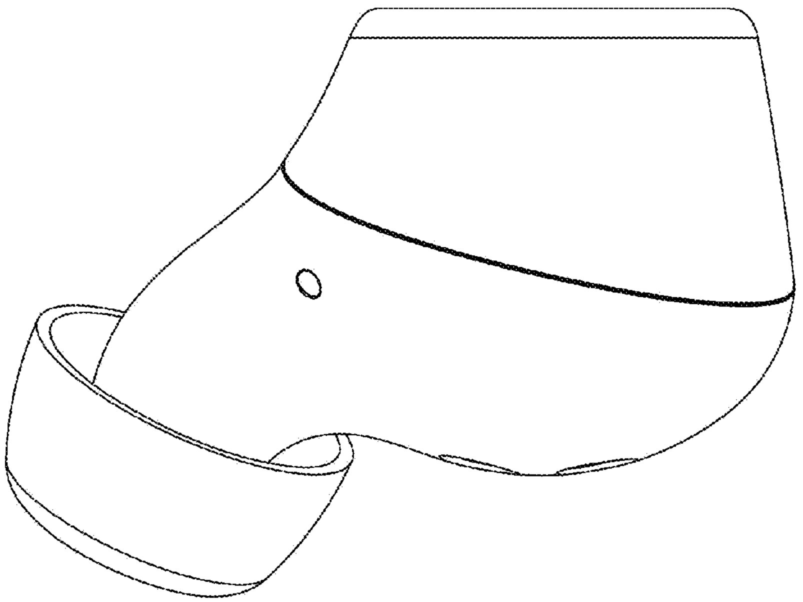
Fig. 5

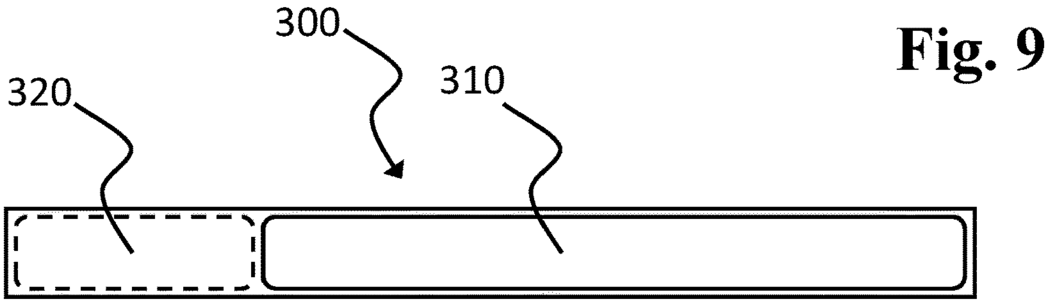
Fig. 9
Fig. 10
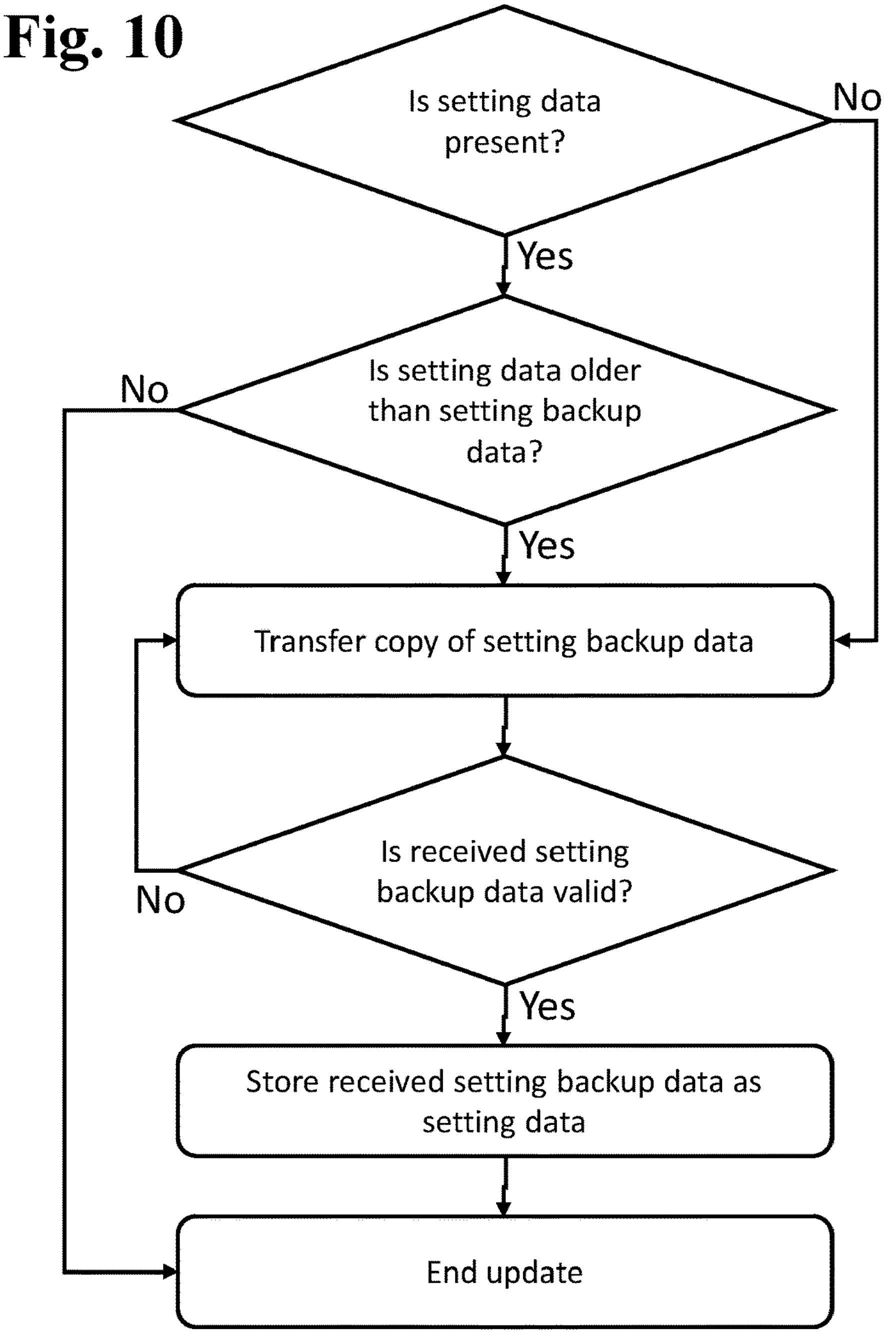

METHOD FOR PROVIDING A SELF-FITTING HEARING TEST

FIELD

The present disclosure relates to a method for providing a self-fitting hearing test, a set of hearing devices configured to carry out the method, a computer program comprising instructions for carrying out the method, and a computer-readable medium comprising instruction which when executed by a computer carries out the method.

BACKGROUND

Hearing devices adapted to be worn at the ears of the user are becoming increasingly personalized. For hearing devices such as hearing aids this has long been the case, and these have included gain settings, which are frequency dependent on the user's personal hearing profile, so that the hearing devices could provide customized amplification in different frequency bands to compensate for the user's hearing deficit. This has recently also become a feature in hearing devices for the consumer segment.

However, for hearing aids, which are medical devices, setting up the hearing devices requires a consultation with a hearing care professional, which is a lengthy and for some consumers expensive process. For consumer devices, such as ear buds and headsets, it is up to the consumers themselves to customize their settings, which often results in a customization that is less than optimal.

At the heart of optimizing a hearing device or a set of hearing devices for the specific user, is the process of obtaining correct audiogram data for the user which represents the user's hearing ability in a number of frequency bands, as such audiogram data is necessary for calculating the amount of gain the hearing device(s) should apply in the frequency bands to produce an acoustic output signal customized for the used. However, it may be troublesome obtaining the correct audiogram without consulting a hearing care professional.

SUMMARY

Accordingly, there is a need to provide a method which assist the user in performing a self-administered hearing test to obtain correct audiogram data for self-fitting a hearing device to the user.

According to a first aspect, there is provided method for providing a self-fitting hearing test performed via a hearing device adapted to be worn at an ear of a user, the hearing device comprising an output transducer, a wireless communication interface, a processing unit, and a memory unit, the method comprising the steps of performing a test-cycle comprising a emission timeslot, where a test sound is emitted by the hearing device, the test sound having a test volume and a test frequency, a response timeslot, where a user response indicating whether the user heard the test sound is detected, wherein the response timeslot comprises a grace period following the emission timeslot, and a test-cycle end step, where cycle data indicative of the test-cycle's test volume, test frequency, and user response is added to a test data set, calculating audiogram data indicative of the user's hearing ability based on the test data set, and outputting the audiogram data.

According to a first aspect, there is provided a set of hearing devices comprising a first hearing device adapted to be worn at a first ear of a user and a second hearing device adapted to be worn at a second ear of the user, each of the first and second hearing devices comprising an output transducer, a wireless communication interface, a processing unit, and a memory unit, wherein at least one of the processing units of the first and second hearing device is configured to perform the steps of the method according to the first aspect.

According to a third aspect there is provided a computer program comprising instructions to cause the set of hearing devices according to the second aspect to carry out the steps of the method according to the first aspect.

According to a third aspect there is provided a computer-readable medium having stored thereon the computer program of the third aspect.

It is noted the emission timeslot and the response timeslot overlap partially, so that the response timeslot starts before the emission timeslot ends. Following the end of the emission timeslot, the response timeslot then continues for the grace period, during which user responses are still detected.

It is further noted that an omission of a response by the user in the response timeslot can be detected as an indication that they did not hear the test sound. Hence the term detection should be understood to cover not only the detection of an active action by the user but also a passive action, I.e., the absence of an active action.

For sets of hearing devices comprising a first and a second hearing device, the method of the first aspect may be repeated and performed on the user's second, i.e., other ear, in order to provide audiogram data for both the first and the second ear. In this disclosure audiogram data may be denoted as first or second audiogram data, as a reference to which of the user's ears hearing ability the audiogram data is associated with.

For self-administered hearing tests it is an advantage to provide a grace period in the response timeslot, wherein the grace period follows the emission timeslot, because, as the inventors realized, many people tend to hesitate due to uncertainty as to whether they heard the emitted sound or not. This uncertainty led many users to pause when hearing the test sound to decide whether they were hearing the test sound or merely imagining that they were hearing it, only to miss the response timeslot. The inventors thus found that including a grace period in the response time-slot led to fewer false negatives, and thus improved the quality of the audiogram data in the end.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which:

FIG. 4 is a schematic drawing of a hearing device according to the disclosure, FIG. 5 is a schematic drawing of a hearing device according to the disclosure.

FIG. 9 is a block diagram of exemplary first or second setting data or first or second setting backup data, and FIG. 10 is a flowchart illustrating the update/restoration process of setting data.

DETAILED DESCRIPTION

Figure 1:
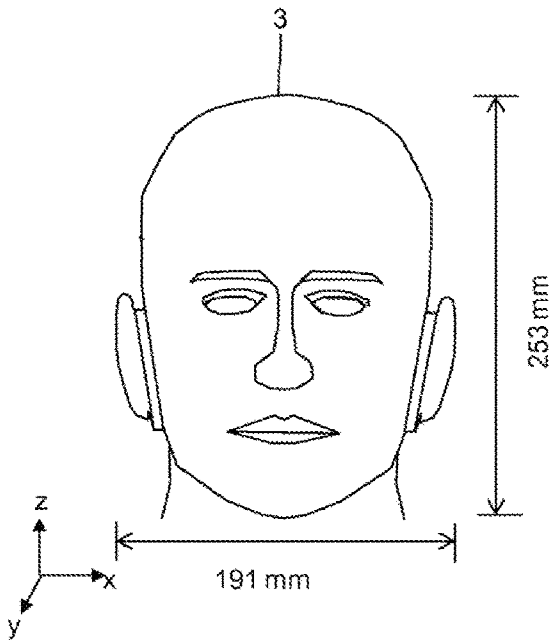
FIG. 1 schematically illustrates a head of a user.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The hearing device(s) may be of the behind-the-ear (BTE) type, which comprises a BTE component for placement behind the ear, the BTE component having a speaker, an in-the-ear component for placement in the ear, and a hollow sound tube connecting the BTE and ITE components for transferring sound from the speaker to the ITE component. The hearing devices may be of the receiver-in-canal (RIC) type also known as receiver-in-the-ear (RITE) or receiver-in-ear (RIE), which comprises a BTE component for placement behind the ear, an in-the-ear component for placement in the ear, the ITE component having a speaker, and connector with one or more conducting wires connecting the BTE and ITE components for transferring electrical signals between the BTE and ITE components. The hearing devices may be of the in-the-ear (ITE) type, in-the-canal (ITC) type, completely in the canal (CIC) type, or a set of earbuds, which comprises an ITE component for placement at least partially in the ear canal, the ITE component having a speaker.

One or both of the hearing devices may be configured for wireless communication with one or more other devices, such as with one or more accessory devices, such as a smartphone and/or a smart watch. Each of the hearing devices comprises a primary antenna and/or a secondary antenna. Any of the antennas may be configured to convert one or more wireless input signals, e.g., a primary wireless input signal and/or a secondary wireless input signal, to antenna output signal(s). The wireless input signal(s) may originate from external source(s), such as spouse microphone device(s), wireless TV audio transmitter, and/or a distributed microphone array associated with a wireless transmitter. The wireless input signal(s) may origin from the other hearing device, and/or from one or more accessory devices.

Each of the hearing devices comprise a radio transceiver coupled to the respective hearing device's primary antenna and/or secondary antenna. The radio transceiver may be configured to convert the antenna output signal(s) to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

Each of the hearing devices may comprise a set of microphones. The set of microphones may comprise one or more microphones. The set of microphones comprises a primary microphone for provision of a primary microphone input signal and/or optionally a secondary microphone for provision of a secondary microphone input signal. The set of microphones may comprise N microphones for provision of N microphone input signal(s), wherein N is an integer in the range from 1 to 10. In one or more exemplary hearing devices, the number N of microphones is two, three, four, five or more. The set of microphones may comprise a tertiary microphone for provision of a tertiary microphone input signal. The set of microphones may comprise other vibration sensors, such as bone vibration sensors.

Each of the hearing devices comprise a processing unit for processing input signal(s), such as transceiver input signal(s) and/or microphone input signal(s). The processing unit is optionally configured to compensate for hearing loss of a user of the hearing device. The compensation may comprise amplifying sound signals in the transceiver input signal(s) and/or microphone input signal(s) by applying gain in one or more frequency bands according to the user's frequency dependent hearing loss. The processing unit may be connected to the radio transceiver for processing the transceiver input signal. The processing unit may be connected the first microphone for processing the first microphone input signal. The processing unit may be connected the second microphone if present for processing the second microphone input signal. The processing unit may comprise one or more A/D-converters for converting analog microphone input signal(s) to digital pre-processed microphone input signal (s).

The processing unit provides an electrical output signal based on the input signals to the processing unit. Input terminal(s) of the processing unit are optionally connected to respective output terminals of a pre-processing unit. For example, a transceiver input terminal of the processing unit may be connected to a transceiver output terminal of the transceiver. One or more microphone input terminals of the processing unit may be connected to respective one or more microphone output terminals of the one or more microphones.

The primary antenna may comprise a coil part coiled along a first antenna axis. The first antenna may be configured for magnetic induction communication, such as in a range of frequencies between 3 MHz and 100 MHz. The primary antenna may be configured for communication in a frequency band in the GHz range, such as at 5 GHZ, such as at 2.4 GHz. The primary antenna may be configured for providing a binaural wireless link between hearing devices located at opposite ears of the user. Optionally the primary antenna may also be configured for providing a wireless link with and external device, i.e., an electronic device other than the first and second hearing devices, such as a computer device, such as a smart device, such as a smart phone or smart watch.

The secondary antenna may be configured for communication in a frequency band in the GHz range, such as at 5 GHZ, such as at 2.4 GHZ, e.g., at Bluetooth frequencies. The secondary antenna may be configured for providing a wireless link with and external device, i.e., an electronic device other than the first and second hearing devices, such as a computer device, such as a smart device, such as a smart phone or smart watch, whilst the primary antenna provides the binaural wireless link between hearing devices.

When outputted the audiogram data can be included in setting data for the hearing device and the setting data is stored in the memory unit. This may allow the processing unit to calculate the appropriate gains based on the audiogram data for processing input signals to compensate for the user's hearing ability or lack thereof. Alternatively, gain data may be obtained based on the audiogram data, and the gain data can be included in the setting data for the hearing device and the setting data is stored in the memory unit.

The emission timeslot may comprise a lock period preceding the response timeslot, wherein user responses submitted in the lock period is discarded. The inventors found that many positive user responses, i.e., responses that indicated that the user heard the test sound, that came quickly, i.e., early in the emission timeslot, were actually false positives. The advantage of including a lock period, is that the number of false positives is reduced.

The duration of the emission timeslot may be chosen at random from an emission duration distribution ranging from a lower emission duration to and upper emission duration. The lower emission duration may be in the range 1 second to 3 seconds and the upper emission duration may be in the range 2 seconds to 4 seconds. The grace period may have a fixed duration ranging from 250 mS to 750 mS.

The step of performing a test-cycle may be repeated for a different test volume and/or a different test frequency. It is advantageous to repeat the test-cycle at multiple test volumes for a frequency as this increases the precision at which the user's hearing ability at that frequency can be calculated for the audiogram data. As hearing loss/hearing ability usually varies through the audible spectrum, it is advantageous to repeat the test-cycle at multiple test frequencies as this allows the hearing ability the be tested in multiple sub frequency bands of the audible frequency band. The step of performing a test-cycle may comprise pausing for a pause duration before proceeding to the next test-cycle if a positive user response is detected.

The method may be performed using a hearing device or a set of hearing devices in combination with an external device, such as a smart phone or smart watch. The user response may be detected using a user interface of the external device, e.g., a touch screen. A processor of the external device may perform the calculation of the audiogram data indicative of the user's hearing ability based on the test data set.

The method may be performed for a set of hearing devices comprising a first hearing device adapted to be worn at the user's first ear and a second hearing device adapted to be worn at the user's second ear, i.e., the method is carried out for the first ear using the first hearing device yielding first audiogram data and for the second ear using the second hearing device yielding second audiogram data. The first audiogram data may be outputted to the first hearing device which may include it in first setting data and store it in the memory unit of the first hearing device.

The second audiogram data may be outputted to the second hearing device which may include it in second setting data and store it in the memory unit of the second hearing device.

The first setting data and backup data may comprise first audiogram data or first gain data, and/or the second setting data and backup data may comprise second audiogram data or second gain data. The first audiogram data and/or second audiogram data may represent results from a user's hearing test of the first ear and the second ear, respectively. The first audiogram data and/or second audiogram data may represent results from a user's computer assisted self-administered hearing test of the first ear and the second ear, respectively. The first gain data and/or second gain data may comprise one or more gain setting(s) derived from audiogram data.

The first audiogram data may comprise level data for two or more frequency values, preferably five or more frequency values, and/or the second audiogram data and/or second gain data comprises level data for two or more frequency values, preferably five or more frequency values. The two or more frequency values may be within the frequency range 20 HZ to 8000 Hz. Preferably, the first audiogram data and/or the second audiogram data comprise level data for two to four frequency values substantially equally distributed in the frequency range 300 Hz to 1200 Hz, e.g. level data for 500 Hz, 750 Hz, and 1000 Hz. Preferably, the first audiogram data and/or the second audiogram data comprise level data for two to four frequency values substantially equally distributed in the frequency range 800 Hz to 2200 Hz, e.g. level data for 1000 Hz, 1500 Hz, and 2000 Hz. Preferably, the first audiogram data and/or the second audiogram data comprise level data for two to six frequency values substantially equally distributed in the frequency range 1500 Hz to 6500 Hz, e.g. level data for 2000 Hz, 4000 Hz, 5000 Hz, and 6000 Hz. The level data will represent the user's level of hearing at the associated frequency value. The first and/or second hearing device(s) may be configured for calculating gain settings for frequency ranges corresponding to the frequency values, e.g., based on the NAL-NL2 prescription procedure, so that the hearing devices can compensate for the user's hearing loss.

The first audiogram data may be based on a first hearing test performed on the user's first ear using the first hearing device. The second audiogram data may be based on a second hearing test performed on the user's second ear using the second hearing device. The first and second hearing tests may be self-administered hearing test performed by the user assisted by a computing device, e.g., a smartphone. The first and second hearing tests may be Bayesian Pure-Tone Audiometry, BPTA, tests.

The first setting data and backup data may comprise first filter data, and/or the second setting data and backup data may comprise second filter data. The filter data may comprise user defined gain modification data representing the user's user preferences for gain modification in one or more frequency ranges, e.g., in the bass, mid, and treble ranges. In some instances, the user may prefer higher or lower gain in some frequency ranges, e.g., some users may prefer additional bass. The gain settings may be calculated based on both the audiogram data and the gain modification data, so as to both compensate for the user's hearing loss and meet their personal preferences.

The first setting data and backup data may comprise time stamp data, and/or the second setting data and backup data may comprise time stamp data. By including time stamp data, the first and/or second hearing device(s) may determine if the setting data or the setting backup data is synchronized or which of the setting data or the setting backup data is the more recent. If the setting data or the setting backup data is not synchronized, i.e., if the time stamps of the setting data or the setting backup data does not match, the set of hearing devices may initiate and update of the outdated of the setting data or the setting backup data, either automatically or by asking the user for permissions to update.

The first audiogram data and/or first gain data may be of the dictionary data type, and/or the second audiogram data and/or second gain data may be of the dictionary data type. Dictionary type data comprises key and value pairs, e.g., a frequency value and a corresponding audiogram level, preferably 8 or more key and value pairs including 8 different frequency values or ranges and corresponding audiogram levels or gain values, e.g.:

Audiogram.

left = [500, 35][750, 22][1000, 21][1500, 27][2000, 15][3000, 17] [4000, 24][6000, 22];

Audiogram.

right = [500, 21][750, 25][1000, 23][1500, 16][2000, 19][3000, 25] [4000, 25][6000, 25]

Wherein the key is a frequency in Hz, and the corresponding value represents an audiogram level corresponding to the user's hearing ability around the key frequency value. The key may be the centre frequency of a frequency sub-band. The key may be the starting frequency of a frequency sub-band, i.e., a frequency sub-band may extend from the frequency value of one key to the frequency value of the subsequent key, e.g., from 500 Hz to 750 Hz.

The processing unit of the first hearing device may be configured for validating first setting backup data received via the wireless interface of the first hearing device, and/or the processing unit of the second hearing device may be configured for validating second setting backup data received via the wireless interface of the second hearing device. Validating the received backup data may comprise one or more of the following steps: checking the size of the transferred backup data, checking the data type of the transferred backup data, or checking values of level settings in the transferred backup data against pre-set acceptable level thresholds.

FIG. 1 schematically illustrates a head of a user 3 with a first ear, e.g., the left ear, and a second ear, e.g., the right ear. As most people have varying hearing ability on their left and right ear it is advantageous to provide hearing devices which are customized to the particular ear, i.e., a first hearing device with custom settings for the user's hearing ability on their first ear, and a second hearing device with custom settings for the user's hearing ability on their second ear.

Figure 2:
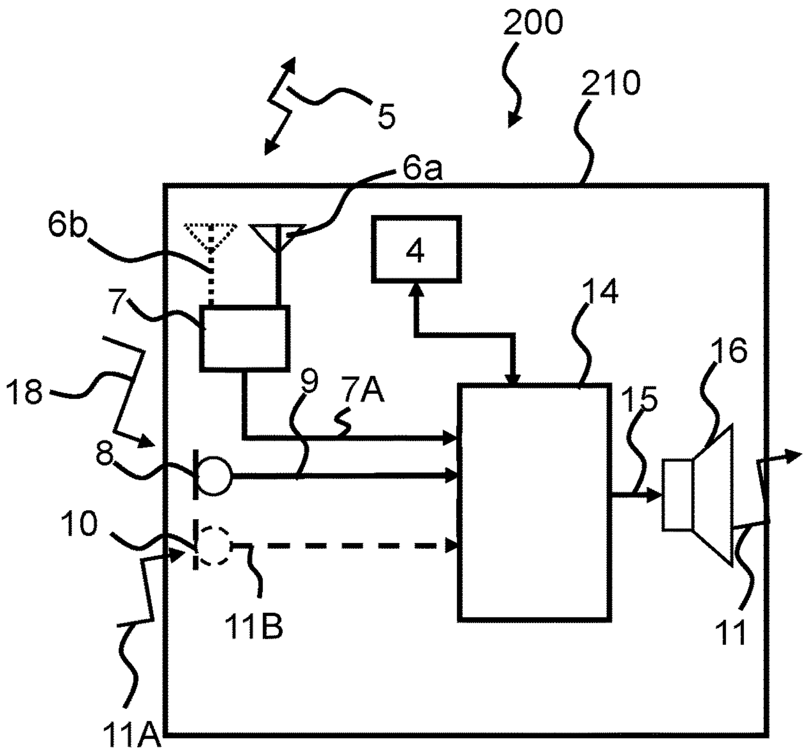
FIG. 2 is a block diagram of an exemplary hearing device according to the disclosure.

FIG. 2 is a block diagram of an exemplary hearing device 200, i.e., a first or second hearing device, according to the disclosure. The hearing device 200 comprises a set of microphones. The set of microphones comprises a primary microphone 8, such as a microphone configured to receive sounds from the environment outside the hearing device 200. The primary microphone 8 provides a primary microphone input signal 9 based a received audio signal 18. The set of microphones optionally comprises a secondary microphone 10, such as an ear canal microphone, for providing a secondary microphone input signal 11B, which is based on a received audio signal 11A.

The hearing device 200 may comprise an ear canal part and another part towards the opening of the ear. In one or more exemplary hearing devices, the secondary microphone 10 is positioned in the ear canal part of the hearing device 200, i.e., the part facing the ear drum or tympanic membrane) and the primary microphone 8 is positioned on the part of the hearing device 200 that faces the opening of the ear (capturing the environment).

The hearing device 200 comprises a casing 210 adapted to be worn at an ear of the user. The casing 210 may house one or more electrical and/or mechanical components of the hearing device 200, such as an output transducer 16, an input transducer 8, 10, a wireless interface, a processing unit 14, and a memory unit 4. A microphone inlet of the primary microphone 8 may be arranged at an outer surface of the casing 210. The microphone inlet of the primary microphone 8 may be configured to receive sounds from the environment outside the hearing device 200, e.g., by the inlet pf the primary microphone 8 being arranged at an outer surface of the casing 210 and facing towards the environment outside the hearing device 200. A microphone inlet of the secondary microphone 10 may be arranged at an outer surface of the casing 210. The microphone inlet of the secondary microphone 10 may be configured to receive sounds from the ear canal of the user wearing the hearing device 200, e.g., by the inlet of the secondary microphone 10 being arranged at an outer surface of the casing 210 and facing towards the ear canal of the user wearing the hearing device 200.

The hearing device 200 may comprise a wireless interface comprising a primary antenna 6*a* and optionally a secondary antenna 6*b* for converting received wireless signal(s) to antenna output signal(s). The primary antenna 6*a* is configured for establishing a wireless binaural link 5 with another hearing device at the user's other ear. The secondary antenna 6*b* is configured for establishing a wireless link with an external device other than the other hearing device, such as a smart device of computing device. In the shown embodiment the primary antenna 6*a* is a magnetic induction coil while the secondary antenna 6*b* is a radio frequency antenna for communication at 2.45 GHZ. The wireless interface may also be denoted as a wireless communication interface.

The hearing device 200 comprises a transceiver 7 coupled to the wireless interface for provision of a transceiver input signal 7A based on one or more antenna output signal(s). The transceiver 7 may be split into sub-units, wherein a respective sub-unit is coupled with one of the plurality of antennas.

The hearing device 200 comprises a processing unit 14 for processing input signal(s) and providing an output signal 15. The processing unit 14 is connected to the transceiver 7 for receiving and processing transceiver input signal(s). The processing unit 14 is connected to the microphones 8, 10 for receiving and processing the microphone input signal(s). The processing unit 14 is configured to compensate for a hearing loss of a user and to provide an output signal 15.

The processing of the transceiver and/or microphone input signal(s) is for some operations, e.g., compensation of hearing loss, performed according to custom settings stored in a memory unit 4 as setting data. The processing unit 14 is coupled to the memory unit 4 so that the processing unit 14 has access to the setting data.

The setting data comprises audiogram data or gain data. Wherein the audiogram data comprises information relating to the user's hearing ability, thus also the user's hearing loss, and the gain data comprises information about the amount of gain that the processing unit 14 should apply when processing in order to compensate for the user's hearing loss. The processing unit 14 may be configured to derive gain settings based on audiogram data.

The memory unit 4 of the hearing device 200 may be a short time/volatile memory such as a random access memory, and/or a cache memory. The memory unit 4 of the hearing device 200 may be a long time/non-volatile memory such as a read-only memory, and/or a flash memory.

The hearing device 200 comprises an output transducer in the form of a receiver 16, i.e., hearing aid terminology for a miniature loudspeaker, operatively coupled to the processing unit 14 so the receiver may receive the output signal 15 and convert the output signal 15 to an acoustic output signal 11. In some embodiments the output transducer may and antenna or implantable device, e.g., a cochlear implant.

The transceiver 7 may also receive signals from the processing unit 14 that are to be transmitted to the other hearing device or to an external device.

Figure 3:
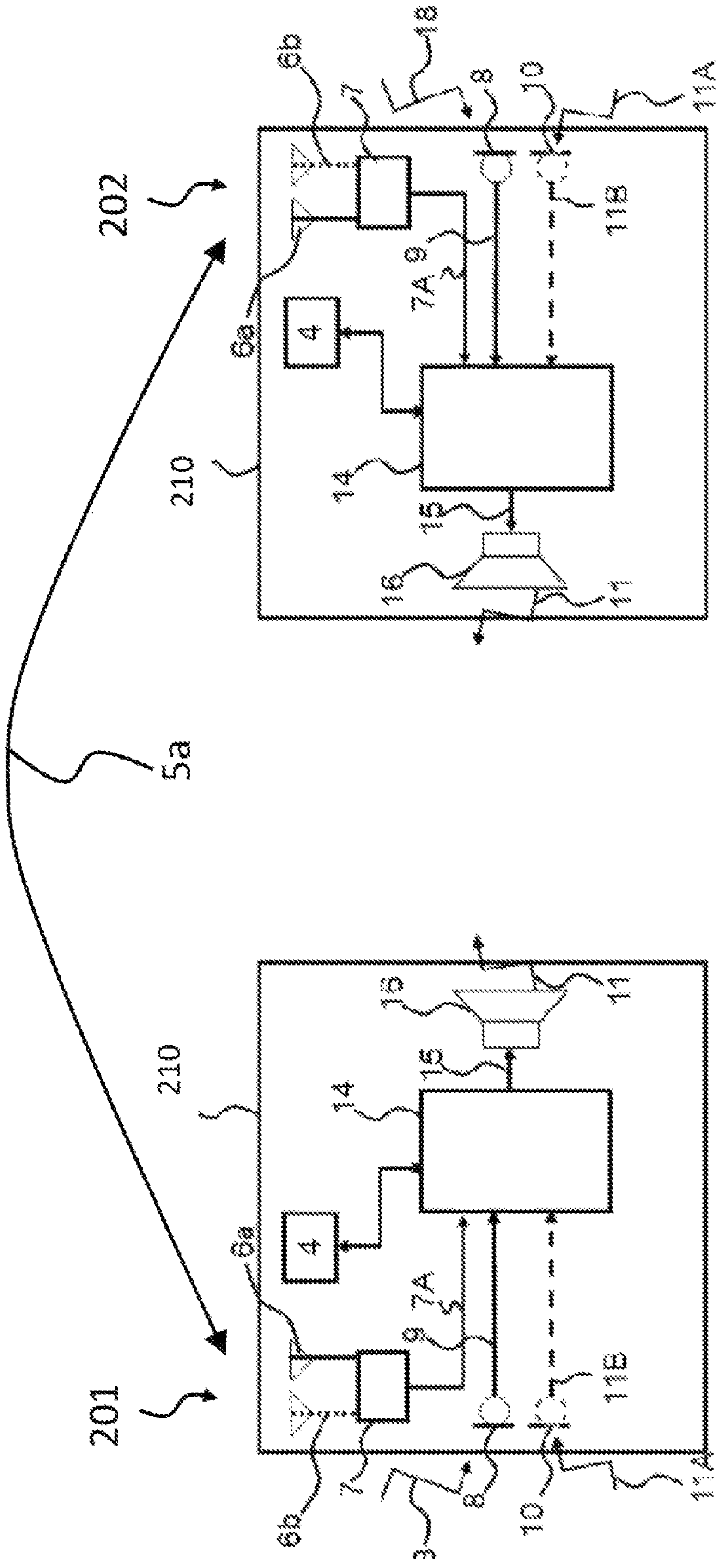
FIG. 3 is a block diagram of an exemplary set of hearing devices according to the disclosure.

FIG. 3 shows a schematical illustration of a set of hearing devices like the ones shown in FIG. 2. The set of hearing devices comprises a first hearing device 201 configured to be worn at a user's first ear and a second hearing device 202 configured to be worn at the user's second ear. Each of the first and second hearing devices 201, 202 comprises the components described for FIG. 2. However, as mentioned above, hearing ability is often different from ear to ear so the first hearing device 201 is provided with first setting data relating to settings for the first ear while the second hearing device 202 is provided with second setting data relating to settings for the second ear, so that each of the hearing devices 201, 202 are customized for their respective ear.

According to some embodiments, the memory unit 4 of the first hearing device 201 comprises second setting backup data, wherein the second setting backup data is a backup of the second setting data. Likewise, the memory unit 4 of the second hearing device 202 comprises first setting backup data, wherein the first setting backup data is a backup of the first setting data.

Thereby, the set of hearing devices 201, 202 is provided with improved redundancy as either of the first and second setting data are backed up on the opposite hearing device. Should the first or second setting data be corrupted the corrupted setting data may be restored by initiating a transfer of setting backup data from the other hearing device, preferably using the binaural wireless link 5. Similarly, should one of the first or second hearing devices 201, 202 be lost or damaged, the user may save the time needed to re-customize the replacement hearing device, as the replacement may receive the backup data stored in the other hearing device.

FIG. 4 shows an exemplary embodiment of the first or second hearing device in the form of a hearing aid of the Receiver in Ear, RIE, type.

FIG. 5 shows an exemplary embodiment of the first or second hearing device in the form of an earbud.

Figure 6:
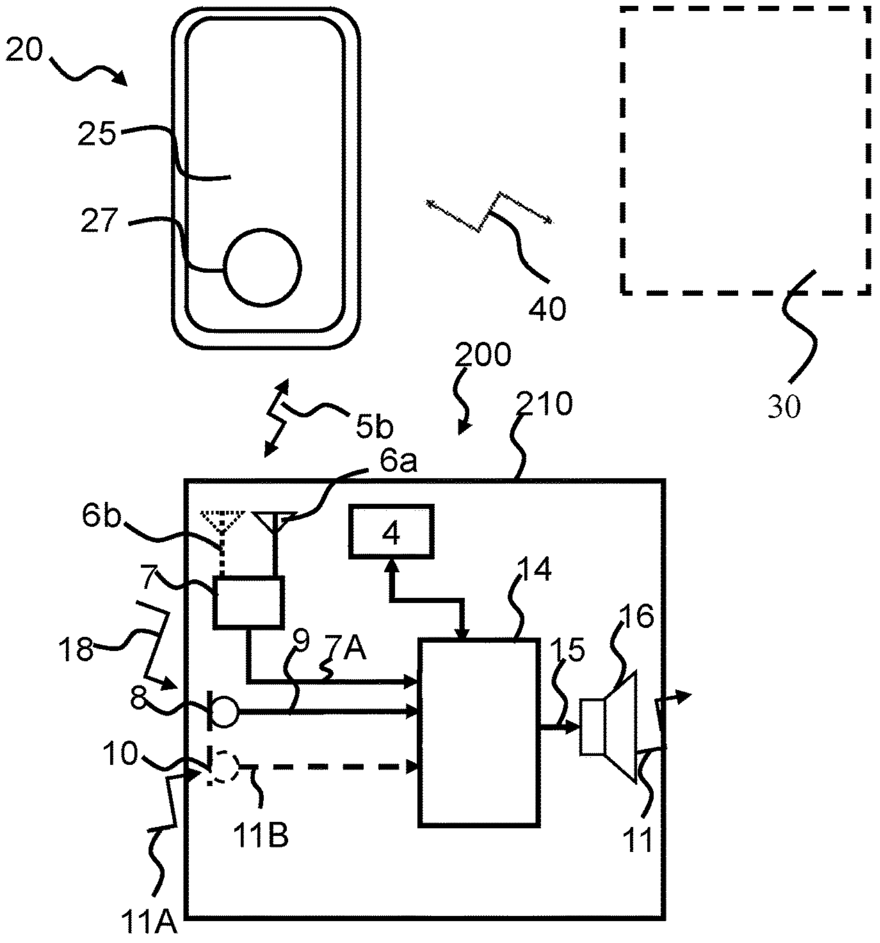
FIG. 6 illustrates a method carried out with a set of hearing devices and a smart device according to some embodiments.

FIG. 6 is a schematic illustration of how the method of the present disclosure may be carried out using a hearing device 200 as described in FIG. 2 and a smart phone 20. It is noted that other external devices than a smart phone may be used, e.g., a computer or smart watch. To carry out the method of the present disclosure, the user will arrange the hearing device 200 in the ear which the hearing device 200 is adapted to be worn in, e.g., left or right, and connect the hearing device 200 to the smart phone 20, preferably via a wireless link 5*b*.

Figure 7:
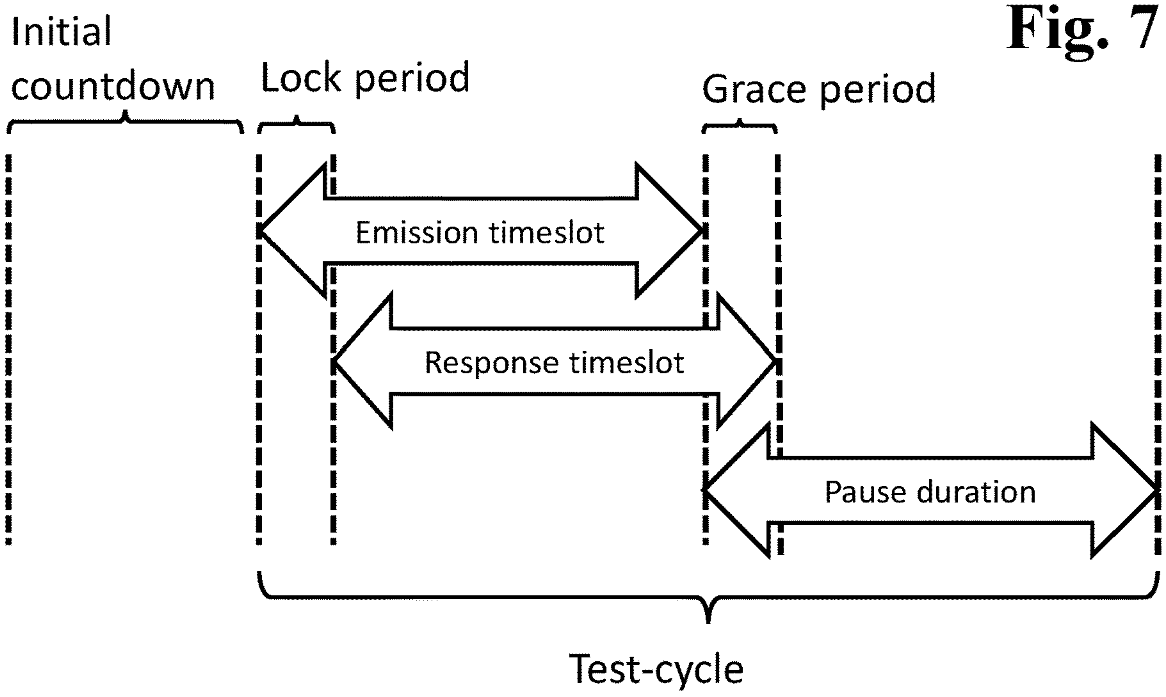
FIG. 7 is a chart showing the timeslots of a test-cycle of a self-administered hearing test according to the disclosure.

Once the smart phone 20 and the hearing device 200 are connected, the user may initiate the self-fitting hearing test using the interface of the smart phone 25, i.e., the touch screen. This will cause the smart phone to carry out a test-cycle as illustrated in FIG. 7. Said test-cycle comprising, in an emission timeslot, playing a test sound having a test volume, e.g., 20 dB, and a test frequency, e.g., 500 Hz, for the user through the receiver 16 of the hearing device 200.

Then, during a response timeslot which partially overlaps with the emission timeslot, a user response indicating whether the user heard the test sound is detected. In practice, this is done by having the user perform an action if they hear the test sound through the hearing device 200. The action could be to tap a virtual button 27 on the touch screen 25 of the smart phone 20 or simply tap the touch screen. On the other hand, if the user does not hear the test sound, then the user response that is detected will be an absence of the action, i.e., the lack of a tap. The response timeslot continues for a grace period after the emission timeslot is over, during which grace period user responses are still detected. The grace period allows the user to get their indication that they heard the test sound detected, even if they hesitate and miss responding while the test sound is playing.

At the end of the test cycle, the detected response, i.e., positive or negative depending on whether the user heard the test sound or not, as well at the test volume and test frequency of the completed test cycle is added to a test data set. Another test cycle may then be repeated for another test volume and/or test frequency, and this process is repeated until sufficient data has been gathered. The user response, test volume, and test frequency for each test-cycle is added to the test data set.

Audiogram data is now calculated based on the test data set. This calculation is either done by a processor of the smart phone 20 or by the processing unit 14 of the hearing device 200. Finally, the audiogram data is outputted and added to setting data stored in the memory unit 4 of the hearing device 200. If there are two hearing devices 201, 202, i.e., a set of hearing devices, then the setting data is also stored in the memory unit 4 of the other hearing device as setting backup data. If there are two hearing devices 201, 202, the self-fitting hearing test may be repeated as described above for the other hearing device.

Before the first test-cycle, there may be an initial countdown, e.g., in the form of an acoustic signal played to the user via the receiver 16, to prepare the user and inform them that the test is about to begin. Each test-cycle may comprise a pause duration to separate the emission timeslot of one test-cycle from that of the subsequent.

It is noted that the method may be carried out aided by a server device 30 connected to the external device via a network 40, e.g., the internet. Optionally, the server may assist or perform the step of calculating the audiogram data.

Figure 8:
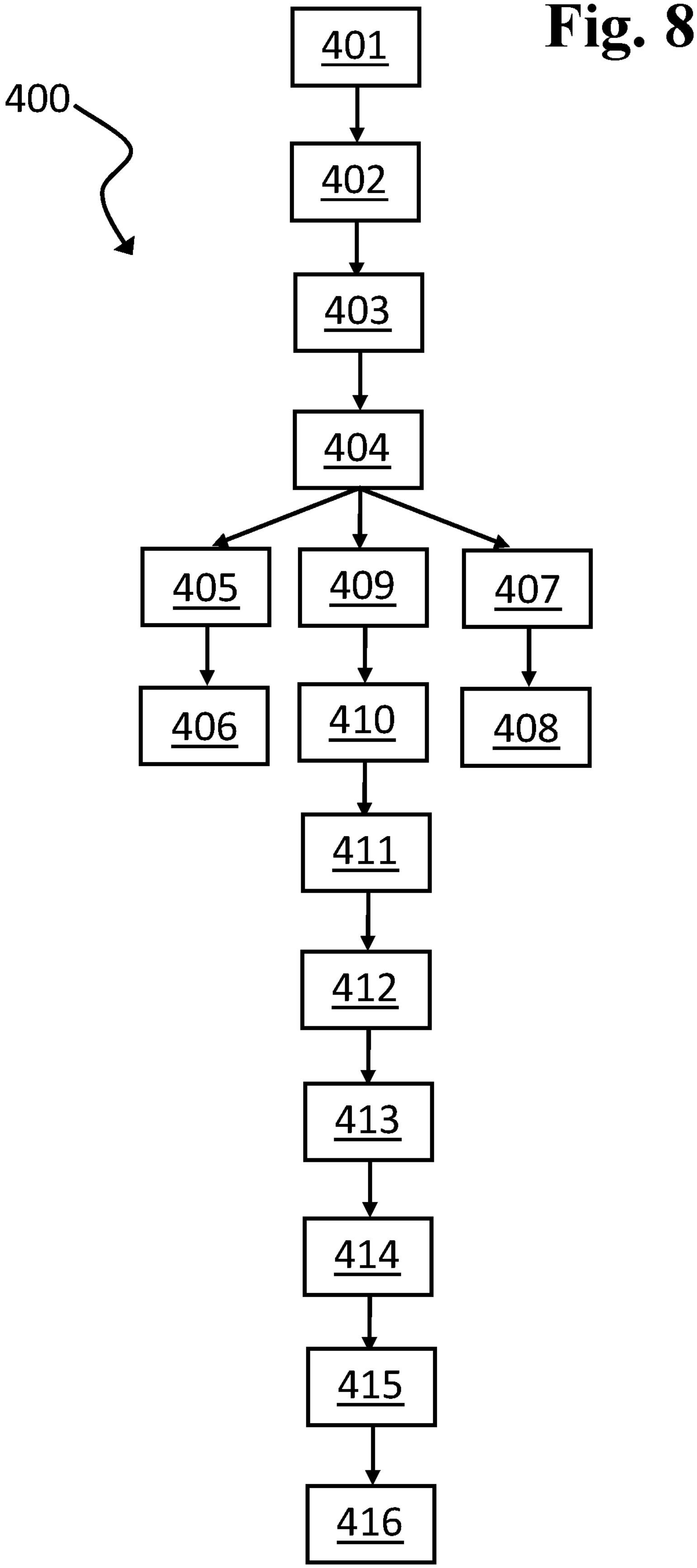
FIG. 8 shows a flow-chart of a method of determining ambient noise during a self-administered hearing test.

FIG. 8 shows a flow-chart of a method 400 of determining ambient noise during such a self-administered hearing test. The method comprises the step of performing 401 via the first hearing device 201 a first hearing test on the first ear of the user. The method comprises the step of, while performing the first hearing test, obtaining 402 via the second hearing device 202 a second input signal. The second input signal being indicative of ambient noise. The second input signal may be obtained by the primary microphone 8 of the second hearing device 202, and/or the second input signal may be obtained by the secondary microphone 8 of the second hearing device 202. The method comprises the step of, based on the second input signal, determining 403 a first ambient noise level. The step of determining the first ambient noise may be performed by a processing unit 14 of the second hearing device 202. Determining of the first ambient noise may be performed by transmitting the obtained second input signal to an external device, such as a smart device. The smart device may then determine the ambient noise level based on the received second input signal. Determining of the ambient noise level may comprise determining a magnitude or amplitude of the second input signal. The method comprises the step of outputting 404 the first ambient noise level. Outputting the first ambient noise level may comprise generating a user notification notifying the user regarding the first ambient noise level, such as outputting a level of the ambient noise to the user. Outputting the first ambient noise level may comprise outputting the determined first ambient noise level for further processing. Further processing may be carried out by a processing unit of the second hearing device 202, or by a smart device communicatively connected to the second hearing device 202. The method comprises the step of comparing 405 the first ambient noise level to a first noise threshold. The method comprises the step of, if the first ambient noise level exceeds the first noise threshold, outputting 406 a user notification. The user notification may be outputted as an audible message to the user via the output transducer of either or both hearing devices 201, 202. The user notification may be outputted on a smart device communicatively connected to the second hearing device 202, e.g., as a read-able message on a display of the smart device. The method comprises the step of comparing 407 the first ambient noise level to a second noise threshold. The second noise threshold may differ from the first noise threshold. The second noise threshold may have a higher threshold value, so during a hearing test the user is first notified, and then the test is stopped. The method comprises the step of, if the first ambient noise level exceeds the second noise threshold, stopping 408 the first hearing test. Stopping the hearing test may be associated with a user notification, informing the user that the ambient noise level is too high to conduct a hearing test. The method comprises the step of, subsequently to performing the first hearing test, performing 409 via the second hearing device 202 a second hearing test on the second ear of the user. The method comprises the step of, while performing the second hearing test, obtaining 410 via the first hearing device 201 a first input signal. The first input signal being indicative of ambient noise. The method comprises the step of, based on the first input signal, determining 411 a second ambient noise level. The method comprises the step of outputting 412 the second ambient noise level. Outputting the second ambient noise level may comprise generating a user notification notifying the user regarding the second ambient noise level, such as outputting a level of the ambient noise to the user. Outputting the second ambient noise level may comprise outputting the determined second ambient noise level for further processing. The second ambient noise level may also be compared to the first and/or the second noise threshold. The method comprises the step of comparing 413 the second ambient noise level to the second noise threshold. The method comprises the step of, if the first ambient noise level exceeds the second noise threshold, stopping 414 the second hearing test and storing the result of the first hearing test. Storing of the result of the first hearing test may happen in a non-volatile memory 4 of the first hearing device 201 and/or the second hearing device 202. The method comprises the step of, if the user reinitiates the hearing test after having been stopped during the second hearing test performing 415 via the second hearing device 202 the second hearing test on the second ear of the user. The method comprises the step of determining 416 a hearing profile based on the stored result of the first hearing test and the result of the second hearing test.

FIG. 9 shows an example of a first or second setting data package and first or second setting backup data package. The data package 300 comprises audiogram and/or gain data 310, the audiogram data relating to the user's hearing ability and the gain data relating to how much gain should be applied by the processing unit to compensate for the user's hearing loss. The gain data is derived from audiogram data, and the audiogram data is derived from a hearing test of the user. Both the audiogram data and the gain data are preferably split into multiple frequency sub-bands, where each frequency sub-band is associated with an audiogram value, which represents the user's hearing ability in that frequency sub-band, and/or gain value, which represents how much gain should be applied by a processing unit in that frequency sub-band.

The first and second setting data package and the first and second setting backup data optionally comprise time stamp data 320 which indicates when the data was generated. This allows the set of hearing devices to compare the which of the setting data or setting backup data to check if the two are up to date with each other, and if not which of the two are the most current. As an example, the set of hearing devices may check the time stamp of the first setting backup data in the memory unit of the second hearing device against the time stamp of the first setting data in the memory unit of the first hearing device. If the time stamps show that the first setting backup data is outdated, the set of hearing devices may initiate a backup by transferring a copy of the first setting data to the second hearing device to replace the outdated first setting backup data. If the time stamps show that the first setting data is older than the first setting backup data, e.g., due to rollbacks, the set of hearing devices may initiate an update by transferring a copy of the first setting backup data in the first hearing device to the second hearing device to replace the outdated first setting data. Finally, if the time stamps are identical then both the setting data and the setting backup data are current, and no update/backup is needed.

FIG. 10 shows a flow-chart of the backup process performed between the first and the second hearing devices 201, 202. An update/restoration of the setting data, i.e., the first setting data of the first hearing device 201 or the second setting data of the second hearing device 202, may be performed routinely and autonomously by the set of hearing devices or on request by the user. The flow chart of FIG. 10 will be described from the viewpoint of the first hearing device 201, but it will be equally applicable for the second hearing device 202 by reversing the described roles of the first and second hearing devices.

The update of the first setting data of the first hearing device 201 is initiated by a check by the processing unit 14 of the first hearing device 201 to check whether first setting data is present in the memory unit 4 of the first hearing device 201. If not, the first hearing device 201 will send a query for first setting backup data to the second hearing device 202. If on the other hand first setting data is present in the memory unit 4 of the first hearing device 201, the first hearing device 201 will send a query for first time stamp data of the first setting backup data to the second hearing device 202.

Upon receiving the time stamp time stamp data of the first setting backup data, the processing unit 14 of the first hearing device 201 will compare it with the time stamp data of the first setting data to check if the first setting data is current. If the comparison shows that the first setting data is newer or identical to the first setting backup data, the update process may end. In the case where the time stamp comparison indicates that the first setting data is newer than the first setting backup data, the set of hearing devices may initiate a backup by transferring the first setting data from the first hearing device 201 to the second hearing device 202, e.g., via the wireless link 5, after which the second hearing device 202 will store it in the memory unit 4 of the second hearing device 202 as first setting backup data to replace the outdated first setting backup data. If the comparison of the time stamp data shows that the first setting data is older than the first setting backup data, the first hearing device 201 will send a query for first setting backup data to the second hearing device 202.

Upon receiving the query for the first setting backup data, the second hearing device 202 will transfer a copy of the first setting backup data to the first hearing device 201. When receiving the copy of the first setting backup data, the first hearing device 201 performs a validation of the received data. The validation may comprise one or more of the following steps:

- checking the received first setting backup data for errors using error correction code,
- checking the size of the received first setting backup data,
- checking the data type of the received first setting backup data, or
- checking values of audiogram or gain level settings in the received first setting backup data against pre-set acceptable level thresholds.

If the first hearing device 201 cannot validate the received first setting backup data, the first hearing device 201 will delete it and send a new query for the first setting backup data to the second hearing device, whereby a new copy of the first setting backup data can be transmitted by the second hearing device 202, and the validation process repeated.

Once the first hearing device 201 receives first setting backup data which it can validate, it will proceed by storing it in the memory unit 4 as first setting data, and if present erasing outdated first setting data, whereby the first hearing device 201 is updated/restored with the most current first setting data.

The set of hearing devices may be configured for performing a user self-administered hearing test in order to obtain the first and/or second setting data, the first and/or second audiogram data, and/or the first and/or second gain data.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that the figures comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES

3 head of a user
4 memory unit
5*a* wireless link between first and second hearing devices
5*b* wireless link between hearing device and external device
6*a* primary antenna
6*b* secondary antenna
7 radio transceiver
7*a* transceiver input signal
8 primary microphone
9 primary microphone input signal
10 secondary microphone
11 acoustic output signal
11*a* acoustic input signal
11*b* secondary microphone input signal
14 processing unit
15 output signal
16 receiver
18 acoustic input signal
20 external device, smart phone
25 user interface
27 virtual button
30 server device
40 link between external device and server device

200 hearing device
201 first hearing device
202 second hearing device
210 casing
300 first setting data, second setting data, first setting backup data, or second setting backup data
310 first audiogram data, first gain data, second audiogram data, or second gain data
320 first or second time stamp data
400 method for determining ambient noise during a self-administered hearing test
401 step of performing a first hearing test on the first ear of the user
402 step of obtaining a second input signal
403 step of determining a first ambient noise level
404 step of outputting the first ambient noise level
405 step of comparing the first ambient noise level to a first noise threshold
406 step of outputting a user notification
407 step of comparing the first ambient noise level to a second noise threshold
408 step of stopping the first hearing test
409 step of performing a second hearing test on the second ear of the user
410 step of obtaining a first input signal
411 step of determining a second ambient noise level
412 step of outputting the second ambient noise level
413 step of comparing the second ambient noise level to the second noise threshold
414 step of stopping the second hearing test and storing the result of the first hearing test
415 step of performing via the second hearing device the second hearing test on the second ear of the user
416 step of determining a hearing profile based on the stored result of the first hearing test and the result of the second hearing test

The invention claimed is:

1. A method performed by a hearing device configured to be worn at an ear of a user, the hearing device comprising an output transducer and a processing unit, the processing unit comprising hardware, the method comprising:
- emitting, during an emission timeslot, a test sound by the output transducer of the hearing device, the test sound having a test volume and a test frequency;
- obtaining by the processing unit of the hearing device, during a response timeslot, a user response indicating whether the user heard the test sound, wherein the response timeslot comprises a grace period following the emission timeslot; and
- determining by the processing unit of the hearing device, during a test-cycle end step, a test data set based on cycle data that are indicative of the test volume, the test frequency, and the user response;
- determining, by the processing unit of the hearing device, audiogram data indicative of a hearing ability of the user based on the test data set; and
- outputting the audiogram data;
- wherein the emission timeslot comprises a lock period preceding the response timeslot, wherein during the lock period, a response from the user is detected by the hearing device and is discarded by the hearing device, and wherein the lock period ends before the emission timeslot ends.

2. The method of claim 1, further comprising:
- determining setting data for the hearing device based on the audiogram data; and
- storing the setting data in a memory unit of the hearing device.

3. The method of claim 2, further comprising providing the setting data to another hearing device configured to be worn at another ear of the user;
- wherein the setting data is provided to the other hearing device for storage as backup data.

4. The method of claim 1, further comprising selecting a duration of the emission timeslot from an emission duration distribution ranging from a lower emission duration to an upper emission duration.

5. The method of claim 4, wherein the lower emission duration is anywhere from 1 second to 3 seconds, and the upper emission duration is anywhere from 2 seconds to 4 seconds.

6. The method of claim 4, wherein the duration of the emission timeslot is selected randomly.

7. The method of claim 1, wherein the grace period has a fixed duration ranging from 250 ms to 750 ms.

8. The method of claim 1, wherein the act of emitting the test sound, the act of obtaining the user response, and the act of determining the test data set, are performed during a test-cycle.

9. The method of claim 1, further comprising performing another test-cycle with another test volume different from the test volume, and/or with another test frequency different from the test frequency.

10. The method of claim 9, further comprising pausing for a pause duration before performing the other test-cycle if the user response for the test-cycle is a positive user response.

11. A product having a non-transitory readable medium storing a set of instructions, wherein an execution of the instructions will cause the method of claim 1 to be performed.

12. The method of claim 1, wherein the lock period of the emission timeslot is predetermined.

13. A method performed by a hearing device configured to be worn at an ear of a user, the hearing device comprising an output transducer and a processing unit, the method comprising:
- emitting, during an emission timeslot, a test sound by the output transducer of the hearing device, the test sound having a test volume and a test frequency;
- obtaining by the processing unit of the hearing device, during a response timeslot, a user response indicating whether the user heard the test sound, wherein the response timeslot comprises a grace period following the emission timeslot; and
- determining by the processing unit of the hearing device, during a test-cycle end step, a test data set based on cycle data that are indicative of the test volume, the test frequency, and the user response;
- determining, by the processing unit of the hearing device, audiogram data indicative of a hearing ability of the user based on the test data set; and
- outputting the audiogram data;
- wherein the emission timeslot and the response timeslot overlap partially to allow the user to respond to the test sound while the test sound is being emitted by the output transducer, and wherein the response timeslot begins after the emission timeslot begins.

14. A hearing device configured to be worn at an ear of a user, the hearing device comprising:
- an output transducer configured to emit a test sound during an emission timeslot, the test sound having a test volume and a test frequency; and a processing unit comprising hardware, the processing unit configured to:

obtain, during a response timeslot, a user response indicating whether the user heard the test sound, wherein the response timeslot comprises a grace period following the emission timeslot; and determine, during a test-cycle end step, a test data set based on cycle data that are indicative of the test volume, the test frequency, and the user response; and determine audiogram data indicative of a hearing ability of the user based on the test data set;

wherein the emission timeslot comprises a lock period preceding the response timeslot, wherein the hearing device is configured to detect a response from a user and to discard the response during the lock period, and wherein the lock period ends before the emission timeslot ends.

15. The hearing device of claim 14, further comprising a memory;

wherein the processing unit is configured to determine setting data for the hearing device based on the audiogram data; and wherein the memory is configured to store the setting data.

16. The hearing device of claim 15, further comprising a communication interface configured to provide the setting data to another hearing device for storage as backup data, the other hearing device configured to be worn at another ear of the user.

17. The hearing device of claim 14, wherein the processing unit is configured to select a duration of the emission timeslot from an emission duration distribution ranging from a lower emission duration to an upper emission duration.

18. The hearing device of claim 17, wherein the processing unit is configured to select the duration of the emission timeslot randomly.

19. The hearing device of claim 14, wherein the grace period has a fixed duration ranging from 250 ms to 750 ms.

20. The hearing device of claim 14, wherein the lock period of the emission timeslot is predetermined.

21. A hearing device configured to be worn at an ear of a user, the hearing device comprising:

an output transducer configured to emit a test sound during an emission timeslot, the test sound having a test volume and a test frequency; and a processing unit configured to:

obtain, during a response timeslot, a user response indicating whether the user heard the test sound, wherein the response timeslot comprises a grace period following the emission timeslot; and determine, during a test-cycle end step, a test data set based on cycle data that are indicative of the test volume, the test frequency, and the user response; and determine audiogram data indicative of a hearing ability of the user based on the test data set;

wherein the emission timeslot and the response timeslot overlap partially to allow the user to respond to the test sound while the test sound is being emitted by the output transducer, and wherein the response timeslot begins after the emission timeslot begins.

* * * * *